US012763851B2

(12) United States Patent
Cahill

(10) Patent No.: US 12,763,851 B2
(45) Date of Patent: Oct. 13, 2026

(54) OPTICAL CHANNEL MONITOR (OCM) WITH SPECTRALLY-MULTIPLEXED WAVELENGTH REFERENCE FOR MONITORING OF WAVELENGTH DIVISION MULTIPLEXED (WDM) SIGNALS

(71) Applicant: II-VI Delaware, Inc., Wilmington, DE (US)

(72) Inventor: Michael Cahill, Melbourne (AU)

(73) Assignee: II-VI DELAWARE, INC., Wilmington, DE (US)

( * ) Notice: Subject to any disclaimer, the term of this patent is extended or adjusted under 35 U.S.C. 154(b) by 737 days.

(21) Appl. No.: 18/127,200

(22) Filed: Mar. 28, 2023

(65) Prior Publication Data

US 2024/0333381 A1 Oct. 3, 2024

(51) Int. Cl.
*H04B 10/077* (2013.01)
*H04J 14/02* (2006.01)

(52) U.S. Cl.
CPC .... *H04B 10/0775* (2013.01); *H04J 14/02126* (2023.08)

(58) Field of Classification Search
CPC ....................... H04B 10/0775; H04J 14/02126
See application file for complete search history.

(56) References Cited

U.S. PATENT DOCUMENTS

| | | | | |
|---|---|---|---|---|
| 6,407,376 B1 * | 6/2002 | Korn | H04B 10/077 | 398/79 |
| 6,441,933 B1 * | 8/2002 | Jang | H04B 10/07955 | 398/79 |
| 2002/0141010 A1 * | 10/2002 | Rodgers | H04B 10/077 | 398/9 |
| 2004/0160596 A1 * | 8/2004 | He | H04B 10/07955 | 356/73.1 |
| 2007/0196107 A1 * | 8/2007 | Takita | H04Q 11/0005 | 398/45 |
| 2017/0187484 A1 * | 6/2017 | Cahill | H04Q 11/0066 | |

FOREIGN PATENT DOCUMENTS

CN 217693335 U * 10/2022

* cited by examiner

*Primary Examiner* — Pranesh K Barua
(74) *Attorney, Agent, or Firm* — McAndrews, Held & Malloy, Ltd.

(57) ABSTRACT

Systems and methods are provided for optical channel monitoring (OCM) with an spectrally-multiplexed wavelength reference for monitoring of wavelength division multiplexing (WDM) spectrum.

48 Claims, 9 Drawing Sheets

OPTICAL CHANNEL MONITOR (OCM) WITH SPECTRALLY-MULTIPLEXED WAVELENGTH REFERENCE FOR MONITORING OF WAVELENGTH DIVISION MULTIPLEXED (WDM) SIGNALS

TECHNICAL FIELD

Aspects of the present disclosure relate to optical communication based solutions. More specifically, certain implementations of the present disclosure relate to methods and systems for implementing and utilizing an optical channel monitor (OCM) with a spectrally-multiplexed wavelength reference for monitoring of wavelength division multiplexed (WDM) signals.

BACKGROUND

Limitations and disadvantages of conventional and traditional devices and solutions for transmitting and receiving optical signals will become apparent to one of skill in the art, through comparison of such systems with some aspects of the present disclosure as set forth in the remainder of the present application with reference to the drawings.

BRIEF SUMMARY

System and methods are provided for an optical channel monitor (OCM) with spectrally-multiplexed wavelength reference for monitoring of wavelength division multiplexed (WDM) signals, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

The present disclosure is directed to optical communication based solutions. In particular, implementations based on the present disclosure pertain to optical receivers, and specifically to optical channel monitors (OCM) with a spectrally-multiplexed wavelength reference for monitoring of a wavelength division multiplexing (WDM) spectrum to enhance operation and/or use thereof. In this regard, optical receivers may typically incorporate monitoring circuitry for use in monitoring optical communication, particularly for monitoring optical signals communicated in the course of optical communication. It is desirable to optimize the manner in which such optical monitoring is done. Solutions based on the present disclosure achieve such desirable objectives, particularly by use of enhanced wavelength division multiplexing (WDM) spectrum based channel monitoring circuitry, as illustrated in and described in more detail below with respect to FIGS. 1-9.

Figure 1:
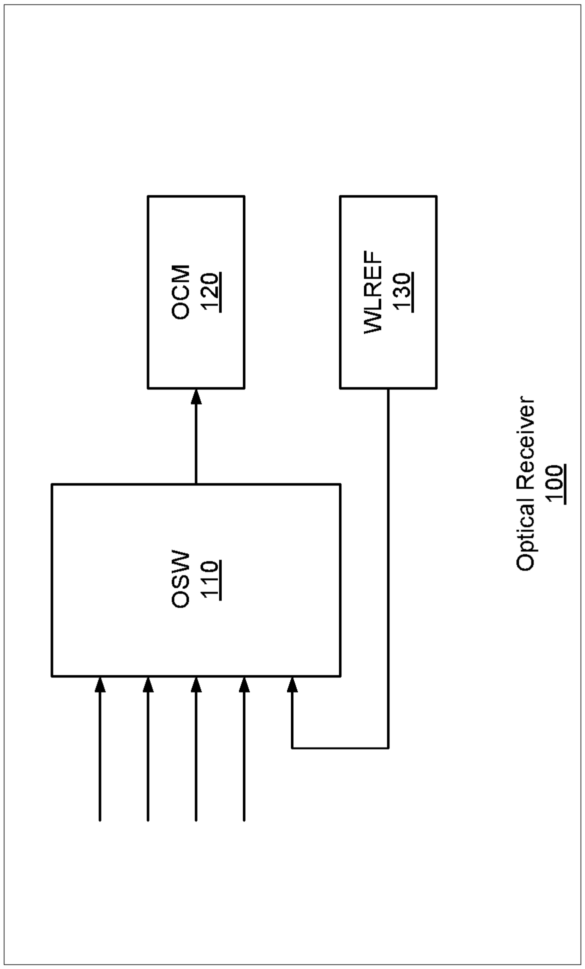
FIG. 1 illustrates an example optical channel monitor (OCM) with conventional configuration for use of wavelength reference (WLREF) connected to one of multiple input ports to be measured.

FIG. 1 illustrates an example optical channel monitor (OCM) with conventional configuration for use of wavelength reference (WLREF) connected to one of multiple input ports to be measured. Referring to FIG. 1, there is shown an optical receiver (or portion thereof) 100.

In this regard, the optical receiver 100 may comprise suitable circuitry for handling reception related operation in a fiber optics based setup, system, and/or network. In particular, the optical receiver 100 may be configured to handle reception of wavelength division multiplexing (WDM) based signals in the course of fiber-optics based communication. As shown in FIG. 1, the portion of the optical receiver 100 illustrated therein may be configured to handle WDM based switching with optical channel monitor (OCM) based measurement. In this regard, the optical receiver 100 may comprise an optical switch (OSW) circuit 110, an optical channel monitor (OCM) circuit 120, and a wavelength reference (WLREF) circuit 130.

The OSW circuit 110 may comprise suitable circuitry for switching (e.g., selecting) among a plurality of signals, providing a single signal as an output. In this regard, as implemented, the OSW circuit 110 may have as inputs a number (e.g., 4) of WDM signals, corresponding to same number (e.g., 4) of WDM input ports in the system, and may additionally receive as an input, an output signal of the WLREF circuit 130.

The OCM circuit 120 may comprise suitable circuitry for measuring the optical power, frequency (e.g., based wavelength), and/or other characteristics of WDM signals. In particular, the OCM circuit 120 may be configured to perform these measurements of a WDM optical spectrum.

The WLREF circuit 130 may comprise suitable circuitry for generating and outputting a reference (WLREF) signal that may have pre-determined characteristics and/or parameters. In particular, the reference (WLREF) signal may have a pre-determined wavelength. The reference (WLREF) signal provided by the WLREF may be specifically configured for use in conjunction with monitoring operations performed in the system, such as by having a wavelength that is particularly suitable for use as reference when handling WDM signals. In some implementations, the WLREF circuit 130 may be configurable, such as based on control signal(s), thus enabling modification of the reference (WLREF) signal and/or characteristics thereof.

In operation, the optical receiver 100 may be used during reception of fiber-optics based communication, particularly wavelength division multiplexing (WDM) based signals used during such communication. The reception and handling WDM signals may require performing monitoring, such as periodically, randomly, based on preset condition(s) for triggering the monitoring, on demand, etc. To that end, the optical channel monitor (OCM) circuit 120 may be used during such monitoring, such as to measure the optical power and frequency (wavelength) of WDM signals, by measuring the WDM optical spectrum. In this regard, in order to ensure accurate measuring of the optical frequency (wavelength), OCMs may use an independent wavelength reference that has unique spectral feature(s) to self-calibrate the OCM in-situ. In this regard, in the optical receiver 100 the WLREF circuit 130 may provide such reference (WLREF) signal.

In conventional configurations, the OCM uses an external wavelength reference that is scanned in a separate action to the scan of the WDM channels. The optical receiver 100 (or the portion thereof shown in FIG. 1) illustrates an example conventional multi-port based OCM-WLREF monitoring arrangement. In this regard, in the optical receiver 100, the OSW circuit 110 may be used to select between a WDM input port (e.g., one of the 4 input WDM ports) and the WLREF. Thus, when needing to scan the reference (WLREF) signal, the OSW circuit 110 selects the input from the WLREF circuit 130, thus providing the reference (WLREF) signal to the OCM circuit 120; otherwise, the OSW circuit 110 selects one of the signals from the input WDM ports and outputs the selected signal to the OCM circuit 120 for measurement thereof during monitoring operations. An example use case when utilizing the optical receiver 100 during OCM measurement is shown in FIG. 2.

Such conventional configurations may have some limitations and/or disadvantages, however. In this regard, one of the main limitations is that the WLREF signal cannot be measured at the same time as the WDM inputs. Such limitation may be undesirable because frequency variations between WDM and WLREF measurements cannot be compensated for, at least not accurately, since these measurements are not done at the same time. Further, there may be delay issues, because timing of the OCM response may be slowed (e.g., by >2×) due to the need to perform multiple measurements, as well as the time needed for other processing action (e.g., OSW switching, settling time, etc.).

Figure 2:
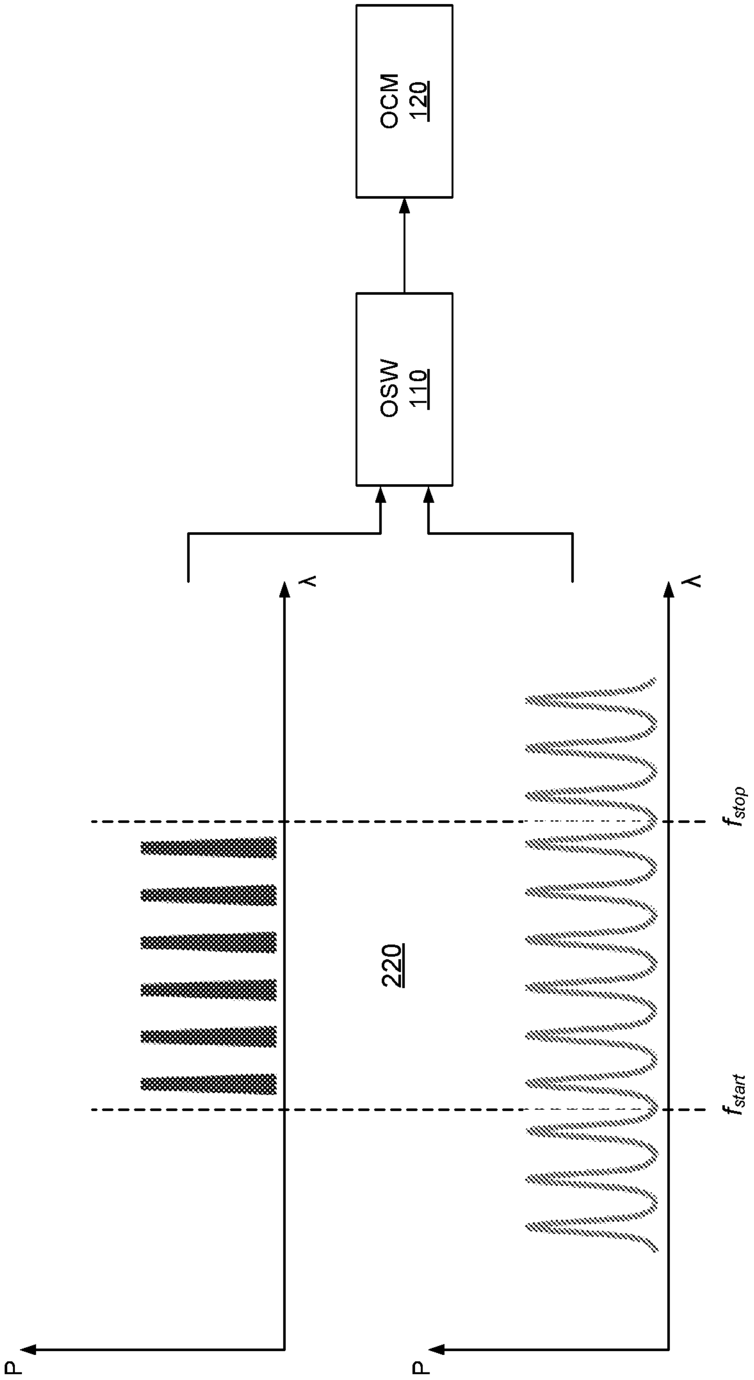
FIG. 2 illustrates an example use case in a conventional configuration incorporating optical channel monitoring with selecting between wavelength reference (WLREF) and wavelength division multiplexing (WDM) measurement.

FIG. 2 illustrates an example use case in a conventional configuration incorporating optical channel monitoring with selecting between wavelength reference (WLREF) and wavelength division multiplexing (WDM) measurement. Shown in FIG. 2 are an OSW circuit 110 and an OCM circuit 120, which may operate substantially as described with respect to, e.g., FIG. 1.

Also shown in FIG. 2 are signal graphs 210 and 220, showing signal power (y-axis) as a function of the wavelength (x-axis) of the signals illustrated therein. In this regard, the signal graph 210 corresponds to an input WDM signal (e.g., corresponding to one of the input WDM ports feeding into OSW block 210), whereas the signal graph 220 corresponds to the WLREF signal generated and provided by the WLREF circuit 130 in FIG. 1). As shown, the input WDM signal 210 may be delineated—that is, having wavelength range between wavelengths corresponding to a first (start) frequency $f_{start}$ and a second (stop) frequency $f_{stop}$. As noted, the WLREF signal 220 has pre-determined characteristics and/or parameters, which may be particularly configured for WDM related measurement.

In this regard, as illustrated in FIG. 2 (and the other figures), the WLREF signal 220 has desirable characteristics, e.g., resulting from use of an optical etalon filter (in the WLREF circuit 130), where the filter response repeats throughout the optical spectrum. Nonetheless, the disclosure is not limited to such approach, and as such other suitable types of optical elements that may create unique spectral signatures and/or characteristics outside the WDM spectrum may be used.

As noted above, the example use case illustrated in FIG. 2 corresponds to use of a conventional configuration, in which either the WLREF signal 220 or a signal from one WDM input is selected via the OSW circuit 110, and then outputted into, and scanned separately by the OCM circuit 120. In other words, the OSW circuit 110 may select either the WLREF signal 220 or the input WDM signal 210, and then the OCM circuit 120 may only scan (and obtain measurements for) whichever one of the two signals is selected and provided by the OSW circuit 110.

As noted above, conventional approaches, such as the one illustrated in FIGS. 1-2, may have some limitations, particularly with respect to the ability to compensate for frequency variations and/or timeliness of the measurements. Implementations in accordance with the present disclosure may overcome the limitations and disadvantages of conventional approaches, particularly by use of designs and arrangements based thereon that allow for measurement of wavelength reference signals while monitoring the WDM signals/channels. In particular, in various example implementations based on the present disclosure, WLREF may be measured in the same trace as the WDM channels, thus overcoming the limitations of conventional OCM-WLREF designs.

In this regard, in such example implementations, suitable arrangements may be used, which may utilize components as OCM optical tuning devices that may measure a wider range than the WDM spectrum. In this regard, as used herein "over-spectrum" may be done at wavelengths higher and lower than the WDM spectrum. Also, one or more optical sources may be used (e.g., in the WLREF components) that have sufficient optical power at wavelengths higher and lower than the WDM spectrum. Also, one or more optical filters may be used (e.g., in the WLREF components) that create spectral characteristics at wavelengths higher and lower than the WDM spectrum. Also, one or more optical filters may be used in a WDM combiner that may combine the WDM spectrum with portions of the WLREF spectrum that exist outside the wavelength range of the WDM spectrum.

It should be readily understood that the combining and integration of WLREF as described with respect to the present disclosure is not limited to particular WDM band, and may be similarly applicable to all WDM bands (e.g., C, L, C++, L++ or C+L bands).

Example implementations based on the present disclosure are illustrated and described in more detail with respect to FIGS. 3-9.

Figure 3:
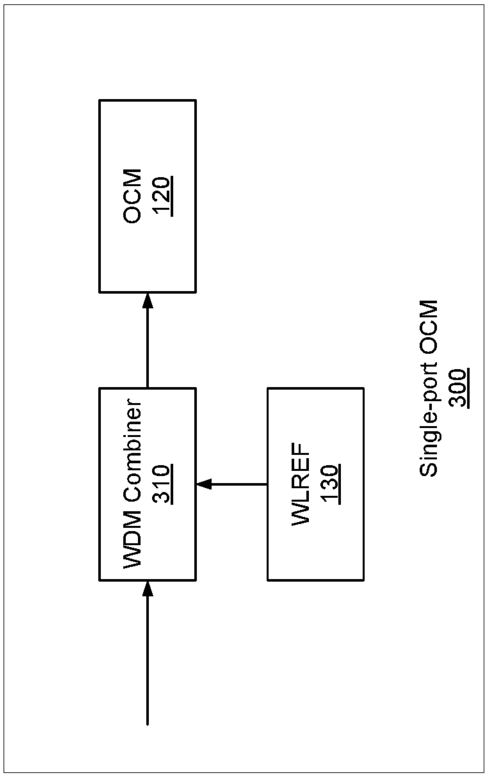
FIG. 3 illustrates an example single-port optical channel monitor (OCM) with spectrally-multiplexed wavelength reference (WLREF) based measurement.

FIG. 3 illustrates an example single-port optical channel monitor (OCM) with spectrally-multiplexed wavelength reference (WLREF) based measurement. Referring to FIG. 3, there is shown a single-port optical channel monitor (OCM) block 300.

In this regard, the OCM block 300 may comprise suitable circuitry for performing optical channel monitoring with spectrally-multiplexed wavelength reference (WLREF) based measurement in a single-port arrangement—that is, with a single input to the OCM block 300, corresponding to, e.g., an input WDM signal. For example, the input WDM signal processed in the OCM block 300 may correspond to an input WDM port in a system incorporating the OCM block 300. As such, in a system comprising multiple input WDM ports, a plurality of OCM blocks 300 may be used, each handling one of the input WDM ports. Thus, in a receiver similar to the optical receiver 100, e.g., 4 OCM blocks 300 may be used, each handling one of the 4 input WDM ports.

As shown in example implementation illustrated in FIG. 3, the OCM block 300 comprises a WDM combiner circuit 310, an OCM circuit 120, and a WLREF circuit 130. The WDM combiner circuit 310 may comprise suitable circuitry for combining the input to the OCM block 300 with the reference signal provided by the WLREF circuit 130. In this regard, the WDM combiner circuit 310 may combine a particular WDM spectrum, such as the portion of the spectrum corresponding to the wavelength range defined by the wavelengths corresponding to the start frequency $f_{start}$ and the stop frequency $f_{stop}$, with the portions of the WLREF spectrum that exist outside the wavelength range of the WDM spectrum.

In an example implementation, the WDM combiner circuit 310 may incorporate a bandpass filter, which may be configured to capture the target WDM spectrum, and one or more edge-pass filters, which may be configured to capture the portions of the WLREF spectrum outside the wavelength range of the WDM spectrum. Nonetheless, the disclosure is not limited to such implementation, and as such any suitable approach for performing the combining functions described here with respect to the WDM combiner circuit 310 may be used and incorporated into the WDM combiner circuit 310.

In some implementations, the WDM combiner circuit 310 may be configurable, such as based on control signal(s), thus enabling for modifying functions thereof, such as to enable adjusting of various operation parameters of the WDM combiner circuit 310—e.g., the wavelength range, the start and/or the stop frequencies (or wavelengths), the overall spectrum that is captured and/or passed, etc.

Figure 5:
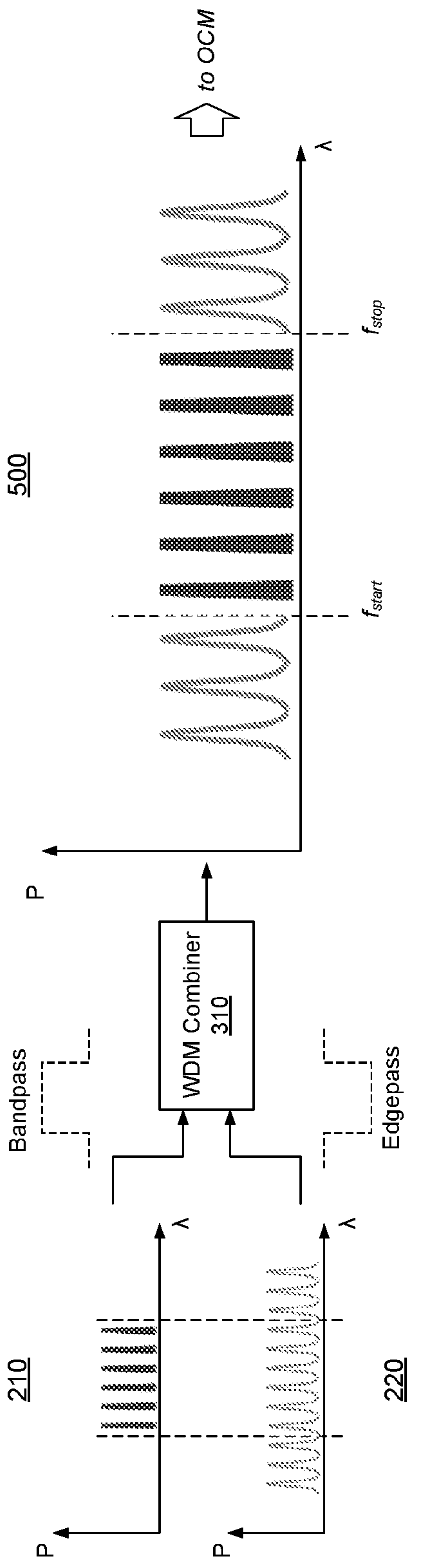
FIG. 5 illustrates an example use case in a configuration incorporating spectral-multiplexing of a wavelength reference (WLREF) signal and input WDM signals.

An example use case when utilizing the OCM block 300 is shown in FIG. 5.

Figure 4:
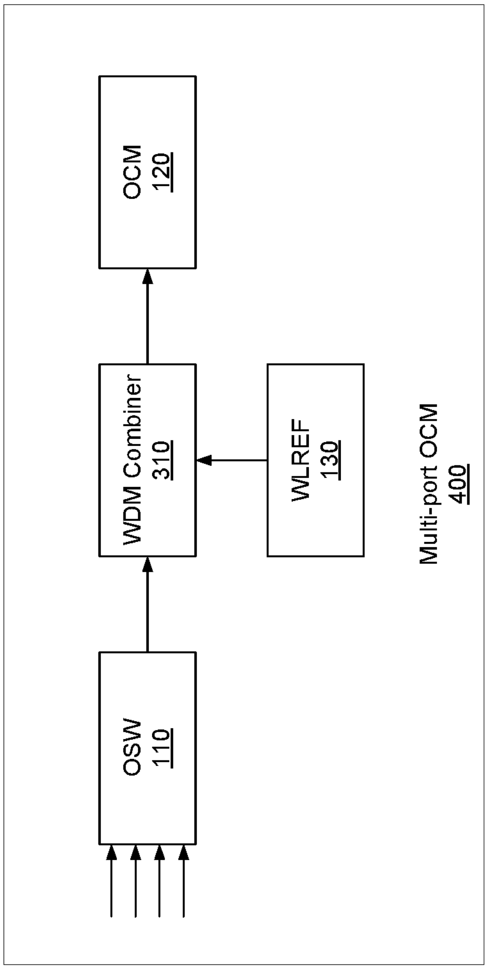
FIG. 4 illustrates an example multi-port optical channel monitor (OCM) with spectrally-multiplexed wavelength reference (WLREF) based measurement.

FIG. 4 illustrates an example multi-port optical channel monitor (OCM) with spectrally-multiplexed wavelength reference (WLREF) based measurement. Referring to FIG. 4, there is shown a single-port optical channel monitor (OCM) block 400.

In this regard, the OCM block 400 may comprise suitable circuitry for performing optical channel monitoring with spectrally-multiplexed wavelength reference (WLREF) based measurement in a multi-port arrangement—that is, with multiple inputs to the OCM block 400, corresponding to multiple input WDM signals. For example, the input WDM signals processed in the OCM block 400 may correspond to multiple input WDM ports in the system incorporating the OCM block 400. As such, in a system comprising same number of input WDM ports, a single OCM block 400 may be used. Thus, in a receiver similar to the optical receiver 100, for example, a single OCM block 400 may be used, each handling one of the 4 input WDM ports.

The OCM block 400 may be substantially similar to the OCM block 300, but may incorporate additional circuitry for handling multiple inputs—that is, incorporate multiple ports. For example, as shown in example implementation illustrated in FIG. 4, the OCM block 400 comprises a WDM combiner circuit 310, an OCM circuit 120, a WLREF circuit 130, and additionally an OSW circuit 110. The OCM block 400 may operate in substantially the same manner as the OCM block 300. However, incorporating the OSW circuit 110 in the OCM block 400 may allow for handling of multiple ports. In this regard, the same basic design described with respect the OCM block 300 may be used in the OCM block 400 for OCM measurement over multiple input ports. In this regard, incorporating the OSW circuit 110 before the WDM combiner circuit 310 allows each port to incorporate the WLREF measurement at the same time as the WDM measurement.

FIG. 5 illustrates an example use case in a configuration incorporating spectral-multiplexing of a wavelength reference (WLREF) signal and input WDM signals. Shown in FIG. 5 is a WDM combiner circuit 310, which may operate substantially as described with respect to, e.g., FIGS. 3-4.

Also shown in FIG. 5 are the signal graphs 210 and 220, as described with respect to FIG. 2, and signal graph 500. In this regard, the signal graph 500 is similar to the signal graphs 210 and 220, thus similarly showing signal power (y-axis) as a function of the wavelength (x-axis) of the signal illustrated therein. As noted, the example use case illustrated in FIG. 5 corresponds to use of a configuration incorporating optical channel monitoring with spectrally-multiplexed wavelength reference based measurement, such as those illustrated in FIGS. 3-4. Accordingly, the signal graph 500 corresponds to the signal outputted by the WDM combiner circuit 310 in such arrangement. In this regard, the WDM combiner circuit 310 may combine portions of the WLREF signal 220 with the input WDM signal 210—namely, the input signal to the single-port optical channel monitor (OCM) block 300, or the signal selected via the OSW circuit 110 in the multi-port optical channel monitor (OCM) block 400—to generate the signal 500.

As illustrated in FIG. 5, the signal 500 comprises the input WDM signal 210, which occupies the portion of the spectrum corresponding to the wavelength range between wavelengths corresponding to the start frequency $f_{start}$ and the stop frequency $f_{stop}$, and additionally the portions of the WLREF signal 220 that are outside of that portion of the spectrum—that is, the portions of the spectrum corresponding to wavelengths less than the wavelength corresponding to the start frequency $f_{start}$ and wavelengths greater than the wavelength corresponding to the stop frequency $f_{stop}$.

The combined signal 500 is then outputted into an OCM circuit (e.g., the OCM circuit 120) for measurement of the combined signal, which allows for optical channel monitoring with spectrally-multiplexed wavelength reference (WLREF) based measurement.

By combining the WLREF and the WDM spectrum, a single scan OCM may be realized, with the capability of measuring the WDM spectrum that can be aligned to the WLREF spectrum. On possible limitation of such approach, however, is that the WLREF may not be directly measured in the WDM spectrum band. In this regard, the frequency (wavelength) accuracy of the OCM in the WDM spectrum band has to be inferred from the WLREF spectrum (and information based thereon) that is outside the WDM spectrum band.

Accordingly, in some example implementations, an arrangement based on the present disclosure may additionally be configured to allow for obtaining information relating to in-band portions of the WLREF trace. For example, in some such implementations, the lack of information relating to the in-band portions of the WLREF trace may be addressed by capturing and availing the WLREF spectral content that is within the band of the WDM spectrum, such by use of a switch with in-band WLREF spectral content provided on a separate port, in the same manner that WLREF may be used in a typical OCM. The in-band WLREF spectral content may then be scanned to enable obtaining information (e.g., measurements) related thereto. This may provide the in-band frequency accuracy that is provided by conventional approaches but doing so using the single-scan capability in implementations based on the present disclosure.

In such example implementations with in-band WLREF measurement, suitable arrangements may be used that may comprise, in addition to the components (e.g., circuits described for spectrally-multiplexed WLREF measurement), such components as an optical switch that may selectively provide in-band spectrum into the OCM, and a splitter to provide the in-band spectrum—e.g., a passive splitter that splits (outputs) the WLREF on different ports (one for combining with the WDM spectrum, and one for connection to an optical switch to the OCM), or an active splitter that provide only certain portions of the WLREF signal. For example, such active splitter (e.g., WDM splitter) may comprise one or more optical filters that may split the WLREF spectrum into a portion that is in-band with the WDM spectrum, and a portion that exists outside the wavelength range of the WDM spectrum. Such "WDM splitter" may be essentially the reverse of the WDM combiner. In other words, the WDM combiner may be configured for operation in the reverse direction, thus allowing for its use as an active splitter if needed.

Example implementations incorporating in-band WLREF spectral measurement are illustrated and described in more detail with respect to FIGS. 6-9.

Figure 6:
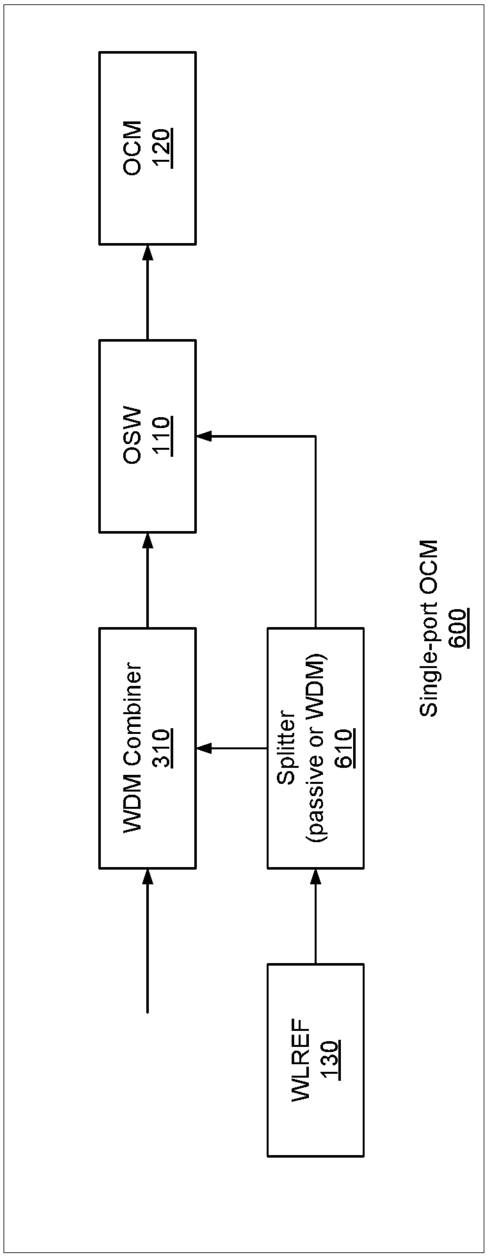
FIG. 6 illustrates an example single-port optical channel monitor (OCM) with spectrally-multiplexed wavelength reference (WLREF) based measurement, with in-band WLREF monitoring and measurement and separate out-of-band WLREF monitoring and measurement.

FIG. 6 illustrates an example single-port optical channel monitor (OCM) with spectrally-multiplexed wavelength reference (WLREF) based measurement, with in-band WLREF monitoring and measurement and separate out-of-band WLREF monitoring and measurement. Referring to FIG. 6, there is shown a single-port optical channel monitor (OCM) block 600.

The OCM block 600 may be substantially similar to the OCM block 300. However, the OCM block 600 may additionally comprise suitable circuitry configured for enabling in-band WLREF monitoring and measurement. In this regard, the OCM block 600 may comprise suitable circuitry for performing optical channel monitoring with spectrally-multiplexed wavelength reference (WLREF) based measurement in a single-port arrangement—that is, with a single input to the OCM block 600, corresponding to, e.g., an input WDM signal. For example, the input WDM signal processed in the OCM block 600 may correspond to an input WDM port in a system incorporating the OCM block 600. As such, in a system comprising multiple input WDM ports, a plurality of OCM blocks 600 may be used, each handling one of the input WDM ports. Thus, in a receiver similar to the optical receiver 100, e.g., 4 OCM blocks 600 may be used, each handling one of the 4 input WDM ports.

As shown in example implementation illustrated in FIG. 6, the OCM block 600 comprises an OSW circuit 110, an OCM circuit 120, a WLREF circuit 130, a WDM combiner circuit 310, and a splitter circuit 610. The splitter circuit 610 may comprise suitable circuitry for splitting an input signal, such as based on corresponding spectrum or portions thereof. In this regard, as used in the OCM block 600, the splitter circuit 610 may be utilized to split the wavelength reference (WLREF) signal provided by the WLREF circuit 130.

The splitter circuit 610 may be configured to provide the splitting functions in different ways. For example, in some implementations the splitter circuit 610 may be a passive splitter, and as such may provide only passive splitting (also referred to herein as optically broadband splitting)—that is, merely outputting copies of the input signal to each of its output ports. In other implementations, the splitter circuit 610 may be an active splitter, and as such may provide active splitting (also referred to herein as spectral splitting)—that is, where the input signal as a whole and/or select portions thereof may be variably outputted at each of its output ports. For example, the splitter circuit 610 may be configured as a WDM active splitter. In this regard, the splitter circuit 610 may be configured to split the input signal (e.g., the WLREF signal) based on particular WDM spectrum (e.g., the WDM spectrum illustrated in FIGS. 2 and 5, delineated by the wavelengths corresponding to the start frequency $f_{start}$ and the stop frequency $f_{stop}$), with only portions of the input signal (e.g., selected based on the WDM spectrum) outputted at some ports.

For example, the splitter circuit 610 may be a 2-port (output) WDM active splitter, outputting at a first port a first portion of the input signal that is in-band with the WDM spectrum, and outputting at a second port a second portion of the input signal that is outside the wavelength range of the WDM spectrum. In an example implementation, the splitter circuit 610 may comprise suitable optical filters to provide such WDM active splitting—e.g., with one or more band-pass filters (matching the WDM spectrum) at the first port and one or more edge-pass filters at the second port to pass the portions outside the WDM spectrum.

In some implementations, the splitter circuit 610 may be configurable, such as based on control signal(s), thus enabling for modifying functions thereof, such as to enable adjusting of various operation parameters of the splitter circuit 610—e.g., the frequencies/wavelengths corresponding to the split bands, the overall spectrum that is processed, etc.

Figure 8:
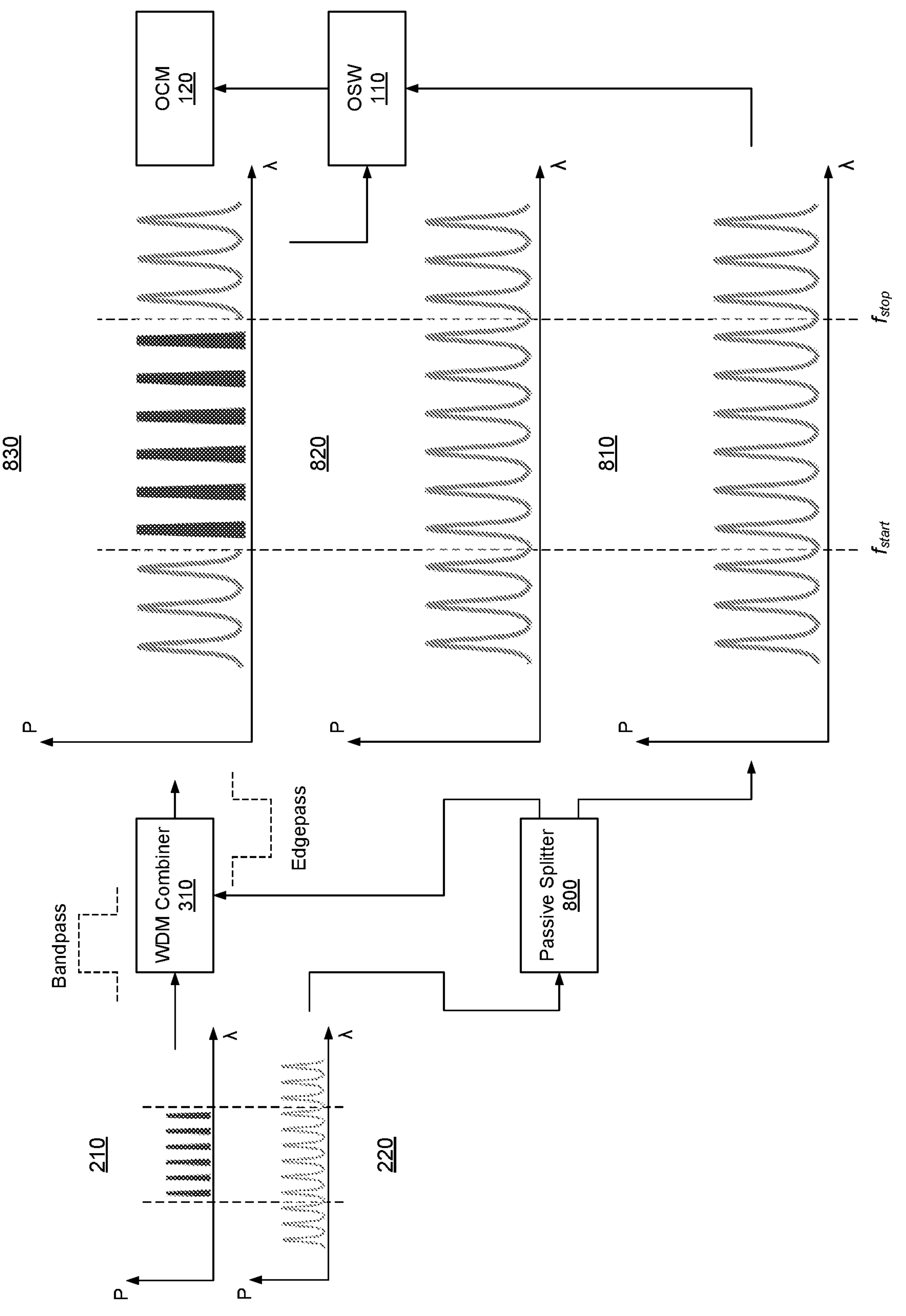
FIG. 8 illustrates an example use case in a configuration incorporating optical channel monitoring with spectrally-multiplexed wavelength reference (WLREF) based measurement, with passive splitter for in-band WLREF monitoring and measurement and separate out-of-band WLREF monitoring and measurement and separate out-of-band WLREF monitoring and measurement.
Figure 9:
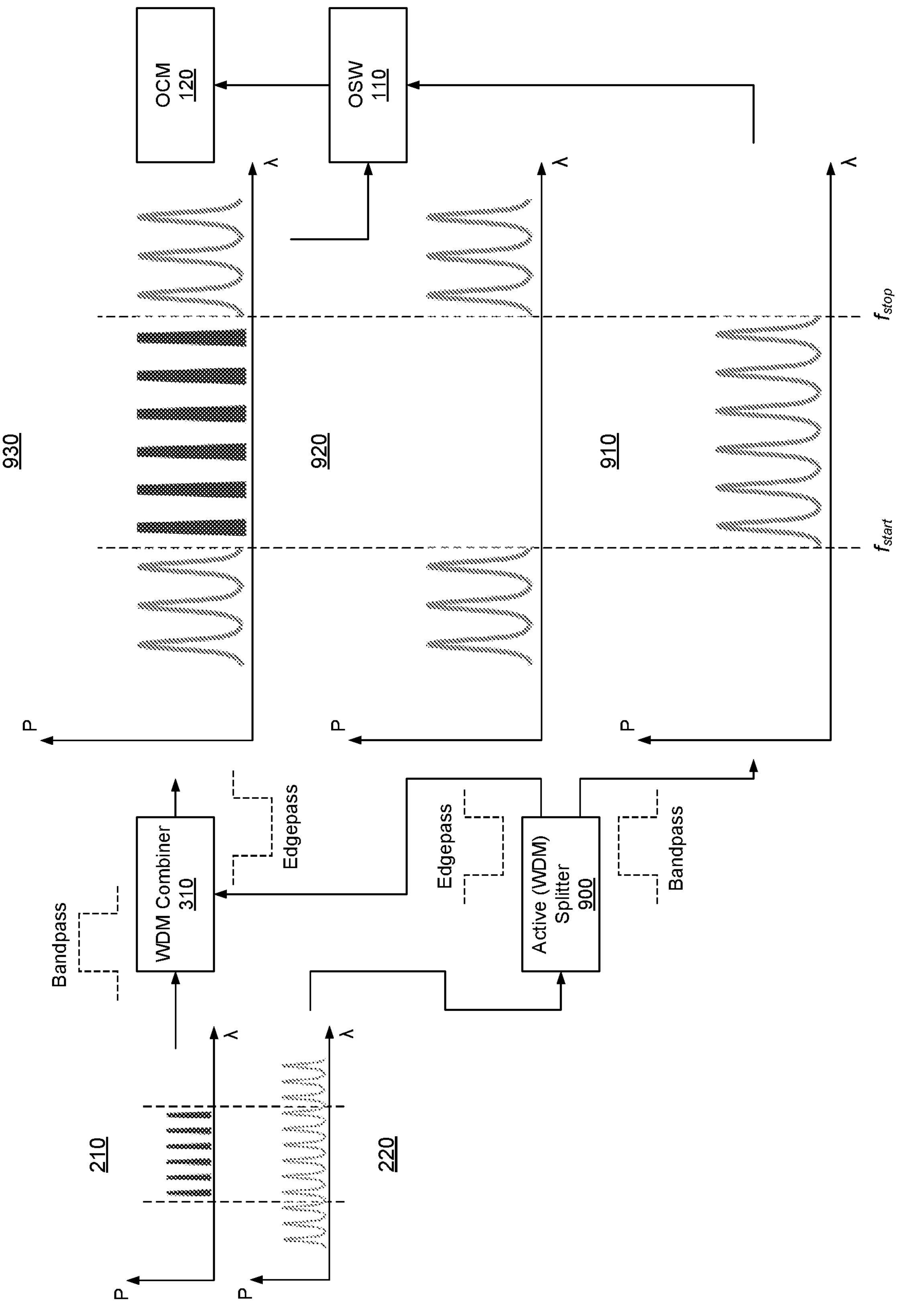
FIG. 9 illustrates an example use case in a configuration incorporating optical channel monitoring with spectrally-multiplexed wavelength reference (WLREF) based measurement, with wavelength division multiplexing (WDM) splitter for in-band WLREF monitoring and measurement and separate out-of-band WLREF monitoring and measurement.

Example use cases utilizing the OCM block 600 are illustrated in FIGS. 8-9.

Figure 7:
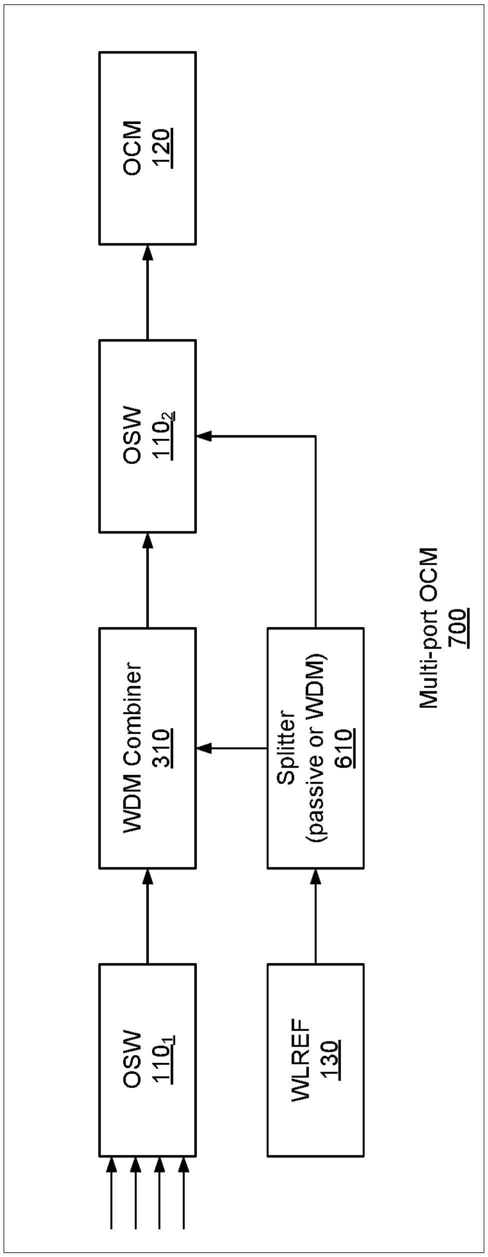
FIG. 7 illustrates an example multi-port optical channel monitor (OCM) with spectrally-multiplexed wavelength reference (WLREF) based measurement, with in-band WLREF monitoring and measurement and separate out-of-band WLREF monitoring and measurement.

FIG. 7 illustrates an example multi-port optical channel monitor (OCM) with spectrally-multiplexed wavelength reference (WLREF) based measurement, with in-band WLREF monitoring and measurement and separate out-of-band WLREF monitoring and measurement. Referring to FIG. 7, there is shown a multi-port optical channel monitor (OCM) block 700.

The OCM block 700 may be substantially similar to the OCM block 600, but may incorporate additional circuitry for handling multiple inputs—that is, incorporate multiple ports. In this regard, the OCM block 700 may comprise suitable circuitry for performing optical channel monitoring with spectrally-multiplexed wavelength reference (WLREF) based measurement in a multi-port arrangement—that is, with multiple inputs to the OCM block 700, corresponding to multiple input WDM signals. For example, the input WDM signals processed in the OCM block 700 may corresponding to multiple input WDM ports in the system incorporating the OCM block 700. As such, in a system comprising the same number of input WDM ports, a single OCM block 700 may be used. Thus, in a receiver similar to the optical receiver 100, for example, a single OCM block 700 may be used, each handling one of the 4 input WDM ports.

For example, as shown in example implementation illustrated in FIG. 7, the OCM block 700 comprises two OSW circuits 1101 and 1102, an OCM circuit 120, a WLREF circuit 130, a WDM combiner circuit 310, and a splitter circuit 610. The OCM block 700 may operate in substantially the same manner as the OCM block 600. However, incorporating the two OSW circuits (particularly the first circuit, incorporating the OSW circuit 1101) in the OCM block 700 may allow for handling of multiple ports. In this regard, the same basic design described with respect the OCM block 600 may be used in the OCM block 700 for OCM measurement over multiple input ports. In this regard, incorporating the OSW circuit 1101 before the WDM combiner circuit 310 allows each port to incorporate the WLREF measurement at the same time as the WDM measurement.

Example use cases utilizing the OCM block 700 are illustrated in FIGS. 8-9.

FIG. 8 illustrates an example use case in a configuration incorporating optical channel monitoring with spectrally-multiplexed wavelength reference (WLREF) based measurement, with passive splitter for in-band WLREF monitoring and measurement and separate out-of-band WLREF monitoring and measurement and separate out-of-band WLREF monitoring and measurement. Shown in FIG. 8 is an OSW circuit 110 and an OCM circuit 120, which may operate substantially as described with respect to, e.g., FIG. 1, a WDM combiner circuit 310, which may operate substantially as described with respect to FIGS. 3-4, and a passive splitter circuit 800, which may correspond to a passive splitter based implementation of the splitter circuit 610, as described with respect to, e.g., FIGS. 6-7.

Also shown in FIG. 8 are the signal graphs 210 and 220, as described with respect to FIG. 2, and signal graphs 810, 820, and 830. In this regard, each of the signal graphs 810, 820, and 830 is similar to the signal graphs 210 and 220, thus similarly showing signal power (y-axis) as a function of the wavelength (x-axis) of the signal illustrated therein. As noted, the example use case illustrated in FIG. 8 corresponds to use of a configuration incorporating optical channel monitoring with spectrally-multiplexed wavelength reference (WLREF) and with in-band WLREF monitoring and measurement, such as those illustrated in FIGS. 6-7. In this regard, the passive splitter circuit 800 may be used to share the WLREF output for combining with the WDM spectrum as well as to provide a direct connection to the OCM.

In particular, the signal graphs 810 and 820 correspond to the signal(s) outputted by the passive splitter circuit 800. In this regard, each of the signal 810 and the signal 820 may be identical to the WLREF signal 220, as the passive splitter circuit 800 is configured to passively split the WLREF signal 220—that is, merely outputs copies thereof—to its 2 output ports, with one the signals (the signal 820) inputted into the WDM combiner circuit 310, and the other one (the signal 810) inputted into the OSW circuit 110 (which corresponds to the OSW circuits 1102 in the multi-port optical channel monitor (OCM) block 700).

The signal graph 830 corresponds to the signal outputted by the WDM combiner circuit 310 in such arrangement. In this regard, the WDM combiner circuit 310 may combine portions of the signal 820 with the input WDM signal 210—namely, the input signal to the single-port optical channel monitor (OCM) block 600, or the signal selected via the OSW circuit 1101 in the multi-port optical channel monitor (OCM) block 700—to generate the signal 830. Thus, once generated, the signal graph 830 comprises the input WDM signal 210, which occupies the portion of the spectrum delineated between the start frequency $f_{start}$ and the stop frequency $f_{stop}$, and the portions of the signal 820 that are outside of that portion of the spectrum—that is, the portions of the spectrum corresponding to wavelengths less than the wavelength corresponding to the start frequency $f_{start}$ and wavelengths greater than the wavelength corresponding to the stop frequency $f_{stop}$.

The signal 830 is then inputted into the OSW circuit 110 (which corresponds to the OSW circuits 1102 in the multi-port optical channel monitor (OCM) block 700), which then selects between the signal 830 and the signal 810, forwarding the selected signal to the OCM 120 for measurement, thus allowing for optical channel monitoring with spectrally-multiplexed wavelength reference (WLREF) based measurement, and with in-band WLREF measurement—that is, of the portion of WLREF signal 220 occupied by the Input WDM signal 210—when needed.

FIG. 9 illustrates an example use case in a configuration incorporating optical channel monitoring with spectrally-multiplexed wavelength reference (WLREF) based measurement, with wavelength division multiplexing (WDM) splitter for in-band WLREF monitoring and measurement and separate out-of-band WLREF monitoring and measurement. Shown in FIG. 9 is an OSW circuit 110 and an OCM circuit 120, which may operate substantially as described with respect to, e.g., FIG. 1, a WDM combiner circuit 310, which may operate substantially as described with respect to FIGS. 3-4, and an active splitter circuit 900, which may correspond to a WDM splitter based implementation of the splitter circuit 610, as described with respect to, e.g., FIGS. 6-7.

Also shown in FIG. 9 are the signal graphs 210 and 220, as described with respect to FIG. 2, and signal graphs 910, 920, and 930. In this regard, each of the signal graphs 910, 920, and 930 is similar to the signal graphs 210 and 220, thus similarly showing signal power (y-axis) as a function of the wavelength (x-axis) of the signal illustrated therein. As noted, the example use case illustrated in FIG. 9 corresponds to use of a configuration incorporating optical channel monitoring with spectrally-multiplexed wavelength reference (WLREF) and with in-band WLREF monitoring and measurement, such as those illustrated in FIGS. 6-7. In this regard, the active (WDM) splitter circuit 900 is used to separate the WLREF output for the combining and tracking stages, such as for lower loss and higher rejection of the WLREF signal in the WDM spectrum.

In particular, the signal graphs 910 and 920 corresponds to the signal(s) outputted by the active splitter circuit 900. In this regard, as the active splitter circuit 900 is configured to perform active splitting (spectral splitting) based on the input WDM—that is separating the WLREF output, for lower loss and higher rejection of the WLREF signal in the WDM spectrum—the signals 910 and 920 correspond to, respectively, 1) copy with the WLREF signal 220 with the portions of the spectrum outside the range delineated by the wavelengths corresponding to the start frequency $f_{start}$ and the stop frequency $f_{stop}$ removed (signal 910), and 2) copy with the WLREF signal 220 with the portions of the spectrum within the range delineated by the wavelengths corresponding to the start frequency $f_{start}$ and the stop frequency $f_{stop}$ removed (signal 920). The signal 920 is then inputted into the WDM combiner circuit 310 whereas the signal 910 is inputted into the OSW circuit 110 (which corresponds to the OSW circuits 1102 in the multi-port optical channel monitor (OCM) block 700).

The signal graph 930 corresponds to the signal outputted by the WDM combiner circuit 310 in such arrangement. In this regard, the WDM combiner circuit 310 may combine portions of the signal 920 with the input WDM signal 210—namely, the input signal to the single-port optical channel monitor (OCM) block 600, or the signal selected via the OSW circuit 1101 in the multi-port optical channel monitor (OCM) block 700—to generate the signal 930. Thus, once generated, the signal graph 930 comprises the input WDM signal 210, which occupies the portion of the spectrum delineated between the start frequency $f_{start}$ and the stop frequency $f_{stop}$, and the signal 920, which occupies the portions of the WLREF signal 220 that are outside of that portion of the spectrum—that is, the portions of the spectrum corresponding to wavelengths less than the wavelength corresponding to the start frequency $f_{start}$ and wavelengths greater than the wavelength corresponding to the stop frequency $f_{stop}$.

The signal 930 is then inputted into the OSW circuit 110 (which corresponds to the OSW circuits 1102 in the multi-port optical channel monitor (OCM) block 700), which then selects between the signal 930 and the signal 910, forwarding the selected signal to the OCM 120 for measurements, thus allowing for optical channel monitoring with spectrally-multiplexed wavelength reference (WLREF) based measurement, and with in-band WLREF measurement—that is, of the portion of WLREF signal 220 occupied by the input WDM signal 210—when needed.

An example system, based on the present disclosure, for processing optical signals comprises: an optical channel monitor (OCM) processing block configured for optical channel monitoring with spectrally-multiplexed wavelength reference (WLREF), with the processing block comprising: a wavelength reference (WLREF) circuit configured to generate a wavelength reference (WLREF) signal for use in wavelength calibration for optical channel monitoring; an optical channel monitor (OCM) circuit configured for monitoring wavelength division multiplexing (WDM) channels, with the monitoring comprising measuring one or more characteristics associated with WDM signals communicated via the WDM channels; and a WDM combiner circuit configured to generate a combined signal based on combining of a first combining input signal and a second combining input signal; where the first combining input signal comprises an input WDM signal; where the second combining input signal comprises the WLREF signal or a signal generated based on the WLREF signal; and where the OCM circuit is configured to apply the monitoring to the combined signal.

In an example embodiment, the optical channel monitor (OCM) processing block further comprises an optical switch (OSW) circuit configured to select one signal from a plurality of switching input signals, and to output the selected one signal, and wherein the selected one signal is inputted into combiner circuit as the first combining input signal.

In an example embodiment, the optical channel monitor (OCM) processing block further comprises an optical splitter circuit configured to split a splitting input signal and output a plurality of splitting output signals via a corresponding plurality of split ports, and where the splitting input signal comprises the WLREF signal.

In an example embodiment, the splitter circuit is further configured to apply optically broadband splitting, and wherein the broadband splitting comprises outputting the entire splitting input signal via each of the plurality of split ports. In an example embodiment, the splitter circuit is further configured to apply spectral splitting, and wherein the spectral splitting comprises outputting variably, via each of the plurality of split ports, portions of an optical spectrum corresponding to the splitting input signal or a splitting output signal comprising a portion of the splitting input signal.

In an example embodiment, the splitter circuit is further configured to apply wavelength division multiplexing (WDM) splitting, and where: applying the WDM splitting comprises outputting a first splitting output signal via a first one of the plurality of split ports and a second splitting output signal via a second one of the plurality of split ports, where the first splitting output signal comprises an in-band portion of the WLREF signal corresponding to a WDM spectrum of the input WDM signal, and where the second splitting output signal comprises an out-band portion of the WLREF signal corresponding to one or more spectrum portions outside the WDM spectrum of the input WDM signal.

In an example embodiment, one of the plurality of splitting output signals is inputted into the WDM combiner circuit as the second combining input signal.

In an example embodiment, the optical channel monitor (OCM) processing block further comprises an optical switch (OSW) circuit configured to select one signal from a plurality of switching input signals, and where one of the plurality of splitting output signals is inputted into the OSW circuit as one of the plurality of switching input signals.

In an example embodiment, the combined signal is inputted into the OSW circuit as another one of the plurality of switching input signals.

In an example embodiment, the selected one signal is inputted into the OCM circuit.

In an example embodiment, the splitting input signal comprises the WLREF signal.

In an example embodiment, the WDM combiner circuit comprises one or more filters configured to apply filtering to one or both of the first combining input signal and the second combining input signal when generating the combined signal.

In an example embodiment, the one or more filters comprise one or both of an optical edge-pass filter and an optical bandpass filter.

An example method, based on the present disclosure, for optical channel monitoring with spectrally-multiplexed wavelength reference (WLREF) comprises: generating a wavelength reference (WLREF) signal for use in wavelength division multiplexing (WDM) measurement; applying optical channel monitoring of WDM channels, with the optical channel monitoring comprising measuring one or more characteristics associated with WDM signals communicated via the WDM channels; and generating a combined signal based on combining of a first combining input signal and a second combining input signal; where: the first combining input signal comprises an input WDM signal; the second combining input signal comprises the WLREF signal or a signal generated based on the WLREF signal; and the optical channel monitoring is applied to the combined signal.

In an example embodiment, the method further comprises applying switching, where the switching comprises selecting one signal from a plurality of switching input signals, and outputting the selected one signal; and inputting the selected one signal as the first combining input signal.

In an example embodiment, the method further comprises applying splitting to a splitting input signal, and outputting a plurality of splitting output signals, where the splitting input signal comprises the WLREF signal.

In an example embodiment, the method further comprises applying optically broadband splitting, wherein the optically broadband splitting comprises outputting the entire splitting input signal as each one of the plurality of splitting output signals.

In an example embodiment, the method further comprises applying spectral splitting, wherein the spectral splitting comprises outputting variably the entire splitting input signal or a splitting output signal comprising a portion of the splitting input signal.

In an example embodiment, the method further comprises applying wavelength division multiplexing (WDM) splitting, where applying the WDM splitting comprises outputting a first splitting output signal and a second splitting output signal, and where: the first splitting output signal comprises an in-band portion of the WLREF signal corresponding to a WDM spectrum of the input WDM signal, and the second splitting output signal comprises an out-band portion of the WLREF signal corresponding to one or more spectrum portions outside the WDM spectrum of the input WDM signal.

In an example embodiment, the method further comprises inputting one of the plurality of splitting output signals as the second combining input signal.

In an example embodiment, the method further comprises applying switching, where the switching comprises selecting one signal from a plurality of switching input signals, and where one of the plurality of splitting output signals is inputted as one of the plurality of switching input signals.

In an example embodiment, the method further comprises inputting the combined signal as another one of the plurality of switching input signals.

In an example embodiment, the method further comprises applying the optical channel monitoring to the selected one signal.

In an example embodiment, the splitting input signal comprises the WLREF signal.

In an example embodiment, generating the combined signal comprises applying one or more filtering functions.

In an example embodiment, the one or more filtering functions comprise one or both of optical edge-pass filtering and optical bandpass filtering.

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical implementation may comprise one or more application specific integrated circuit (ASIC), one or more field programmable gate array (FPGA), and/or one or more processor (e.g., x86, x64, ARM, PIC, and/or any other suitable processor architecture) and associated supporting circuitry (e.g., storage, DRAM, FLASH, bus interface circuits, etc.). Each discrete ASIC, FPGA, Processor, or other circuit may be referred to as "chip," and multiple such circuits may be referred to as a "chipset." Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to perform processes as described in this disclosure. Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to be configured (e.g., to load software and/or firmware into its circuits) to operate as a system described in this disclosure.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a)

conversion to another language, code or notation; b) reproduction in a different material form.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system for processing optical signals, the system comprising:
- an optical channel monitor (OCM) processing block configured for optical channel monitoring, the processing block comprising:
  - a wavelength reference (WLREF) circuit configured to generate a wavelength reference (WLREF) signal for use in wavelength calibration for optical channel monitoring;
  - an optical channel monitor (OCM) circuit configured for monitoring WDM channels, the monitoring comprising measuring one or more characteristics associated with WDM signals communicated via the WDM channels; and
  - a wavelength division multiplexing (WDM) combiner circuit configured to generate a combined signal based on combining of a first combining input signal and a second combining input signal;
  - wherein the first combining input signal comprises an input WDM signal;
  - wherein the second combining input signal comprises the WLREF signal or a signal generated based on the WLREF signal;
  - wherein the OCM circuit is configured to apply the monitoring to the combined signal; and
  - wherein the optical channel monitor (OCM) processing block further comprises an optical switch (OSW) circuit configured to select one signal from a plurality of switching input signals, and to output the selected one signal, and wherein the selected one signal is inputted into combiner circuit as the first combining input signal.

2. The system according to claim 1, wherein the optical channel monitor (OCM) processing block further comprises an optical splitter circuit configured to split a splitting input signal to a plurality of splitting output signals via a corresponding plurality of split ports, and wherein the splitting input signal comprises the WLREF signal.

3. The system according to claim 1, wherein the WDM combiner circuit comprises one or more filters configured to apply filtering to one or both of the first combining input signal and the second combining input signal when generating the combined signal.

4. The system according to claim 3, wherein the one or more filters comprise one or both of an optical edge-pass filter and an optical bandpass filter.

5. A method for optical channel monitoring, the method comprising:
- generating a wavelength reference (WLREF) signal for use in wavelength division multiplexing (WDM) measurement;
- applying optical channel monitoring of WDM channels, the optical channel monitoring comprising measuring one or more characteristics associated with WDM signals communicated via the WDM channels;
- generating a combined signal based on combining of a first combining input signal and a second combining input signal;
- wherein:
  - the first combining input signal comprises an input WDM signal;
  - the second combining input signal comprises the WLREF signal or a signal generated based on the WLREF signal; and
  - the optical channel monitoring is applied to the combined signal;
- applying switching, wherein the switching comprises selecting one signal from a plurality of switching input signals, and outputting the selected one signal; and
- inputting the selected one signal as the first combining input signal.

6. The method according to claim 5, further comprising applying splitting to a splitting input signal, and outputting a plurality of splitting output signals, wherein the splitting input signal comprises the WLREF signal.

7. The method according to claim 5, wherein generating the combined signal comprises applying one or more filtering functions.

8. The method according to claim 7, wherein the one or more filtering functions comprise one or both of optical edge-pass filtering and optical bandpass filtering.

9. A system for processing optical signals, the system comprising:
- an optical channel monitor (OCM) processing block configured for optical channel monitoring, the processing block comprising:
  - a wavelength reference (WLREF) circuit configured to generate a wavelength reference (WLREF) signal for use in wavelength calibration for optical channel monitoring;
  - an optical channel monitor (OCM) circuit configured for monitoring WDM channels, the monitoring comprising measuring one or more characteristics associated with WDM signals communicated via the WDM channels; and
  - a wavelength division multiplexing (WDM) combiner circuit configured to generate a combined signal based on combining of a first combining input signal and a second combining input signal;
  - wherein the first combining input signal comprises an input WDM signal;
  - wherein the second combining input signal comprises the WLREF signal or a signal generated based on the WLREF signal;
  - wherein the OCM circuit is configured to apply the monitoring to the combined signal;
  - wherein the optical channel monitor (OCM) processing block further comprises an optical splitter circuit configured to split a splitting input signal to a plurality of splitting output signals via a corresponding plurality of split ports, and wherein the splitting input signal comprises the WLREF signal; and
  - wherein the splitter circuit is further configured to apply optically broadband splitting, and wherein the optically broadband splitting comprises outputting the entire splitting input signal via each of the plurality of split ports.

10. The system according to claim 9, wherein the WDM combiner circuit comprises one or more filters configured to apply filtering to one or both of the first combining input signal and the second combining input signal when generating the combined signal.

11. The system according to claim 10, wherein the one or more filters comprise one or both of an optical edge-pass filter and an optical bandpass filter.

12. A system for processing optical signals, the system comprising:
an optical channel monitor (OCM) processing block configured for optical channel monitoring, the processing block comprising:
a wavelength reference (WLREF) circuit configured to generate a wavelength reference (WLREF) signal for use in wavelength calibration for optical channel monitoring;
an optical channel monitor (OCM) circuit configured for monitoring WDM channels, the monitoring comprising measuring one or more characteristics associated with WDM signals communicated via the WDM channels; and
a wavelength division multiplexing (WDM) combiner circuit configured to generate a combined signal based on combining of a first combining input signal and a second combining input signal;
wherein the first combining input signal comprises an input WDM signal;
wherein the second combining input signal comprises the WLREF signal or a signal generated based on the WLREF signal;
wherein the OCM circuit is configured to apply the monitoring to the combined signal;
wherein the optical channel monitor (OCM) processing block further comprises an optical splitter circuit configured to split a splitting input signal to a plurality of splitting output signals via a corresponding plurality of split ports, and wherein the splitting input signal comprises the WLREF signal; and
wherein the splitter circuit is further configured to apply spectral splitting, and wherein the spectral splitting comprises outputting variably, via each of the plurality of split ports, portions of an optical spectrum corresponding to the splitting input signal or a splitting output signal comprising a portion of the splitting input signal.

13. The system according to claim 12, wherein the WDM combiner circuit comprises one or more filters configured to apply filtering to one or both of the first combining input signal and the second combining input signal when generating the combined signal.

14. The system according to claim 13, wherein the one or more filters comprise one or both of an optical edge-pass filter and an optical bandpass filter.

15. A system for processing optical signals, the system comprising:
an optical channel monitor (OCM) processing block configured for optical channel monitoring, the processing block comprising:
a wavelength reference (WLREF) circuit configured to generate a wavelength reference (WLREF) signal for use in wavelength calibration for optical channel monitoring;
an optical channel monitor (OCM) circuit configured for monitoring WDM channels, the monitoring comprising measuring one or more characteristics associated with WDM signals communicated via the WDM channels; and
a wavelength division multiplexing (WDM) combiner circuit configured to generate a combined signal based on combining of a first combining input signal and a second combining input signal;
wherein the first combining input signal comprises an input WDM signal;
wherein the second combining input signal comprises the WLREF signal or a signal generated based on the WLREF signal;
wherein the OCM circuit is configured to apply the monitoring to the combined signal;
wherein the optical channel monitor (OCM) processing block further comprises an optical splitter circuit configured to split a splitting input signal to a plurality of splitting output signals via a corresponding plurality of split ports, and wherein the splitting input signal comprises the WLREF signal; and
wherein the splitter circuit is further configured to apply wavelength division multiplexing (WDM) splitting, and wherein:
applying the WDM splitting comprises outputting a first splitting output signal via a first one of the plurality of split ports and a second splitting output signal via a second one of the plurality of split ports,
the first splitting output signal comprises an in-band portion of the WLREF signal corresponding to a WDM spectrum of the input WDM signal, and
the second splitting output signal comprises an out-band portion of the WLREF signal corresponding to one or more spectrum portions outside the WDM spectrum of the input WDM signal.

16. The system according to claim 15, wherein the WDM combiner circuit comprises one or more filters configured to apply filtering to one or both of the first combining input signal and the second combining input signal when generating the combined signal.

17. The system according to claim 16, wherein the one or more filters comprise one or both of an optical edge-pass filter and an optical bandpass filter.

18. A system for processing optical signals, the system comprising:
an optical channel monitor (OCM) processing block configured for optical channel monitoring, the processing block comprising:
a wavelength reference (WLREF) circuit configured to generate a wavelength reference (WLREF) signal for use in wavelength calibration for optical channel monitoring;
an optical channel monitor (OCM) circuit configured for monitoring WDM channels, the monitoring comprising measuring one or more characteristics associated with WDM signals communicated via the WDM channels; and
a wavelength division multiplexing (WDM) combiner circuit configured to generate a combined signal based on combining of a first combining input signal and a second combining input signal;
wherein the first combining input signal comprises an input WDM signal;
wherein the second combining input signal comprises the WLREF signal or a signal generated based on the WLREF signal;

wherein the OCM circuit is configured to apply the monitoring to the combined signal;

wherein the optical channel monitor (OCM) processing block further comprises an optical splitter circuit configured to split a splitting input signal to a plurality of splitting output signals via a corresponding plurality of split ports, and wherein the splitting input signal comprises the WLREF signal; and wherein one of the plurality of splitting output signals is inputted into the WDM combiner circuit as the second combining input signal.

19. The system according to claim 18, wherein the WDM combiner circuit comprises one or more filters configured to apply filtering to one or both of the first combining input signal and the second combining input signal when generating the combined signal.

20. The system according to claim 19, wherein the one or more filters comprise one or both of an optical edge-pass filter and an optical bandpass filter.

21. A system for processing optical signals, the system comprising:

an optical channel monitor (OCM) processing block configured for optical channel monitoring, the processing block comprising:

a wavelength reference (WLREF) circuit configured to generate a wavelength reference (WLREF) signal for use in wavelength calibration for optical channel monitoring;

an optical channel monitor (OCM) circuit configured for monitoring WDM channels, the monitoring comprising measuring one or more characteristics associated with WDM signals communicated via the WDM channels; and a wavelength division multiplexing (WDM) combiner circuit configured to generate a combined signal based on combining of a first combining input signal and a second combining input signal;

wherein the first combining input signal comprises an input WDM signal;

wherein the second combining input signal comprises the WLREF signal or a signal generated based on the WLREF signal;

wherein the OCM circuit is configured to apply the monitoring to the combined signal;

wherein the optical channel monitor (OCM) processing block further comprises an optical splitter circuit configured to split a splitting input signal to a plurality of splitting output signals via a corresponding plurality of split ports, and wherein the splitting input signal comprises the WLREF signal; and wherein the optical channel monitor (OCM) processing block further comprises an optical switch (OSW) circuit configured to select one signal from a plurality of switching input signals, and wherein one of the plurality of splitting output signals is inputted into the OSW circuit as one of the plurality of switching input signals.

22. The system according to claim 21, wherein the combined signal is inputted into the OSW circuit as another one of the plurality of switching input signals.

23. The system according to claim 21, wherein the selected one signal is inputted into the OCM circuit.

24. The system according to claim 21, wherein the WDM combiner circuit comprises one or more filters configured to apply filtering to one or both of the first combining input signal and the second combining input signal when generating the combined signal.

25. The system according to claim 24, wherein the one or more filters comprise one or both of an optical edge-pass filter and an optical bandpass filter.

26. A system for processing optical signals, the system comprising:

an optical channel monitor (OCM) processing block configured for optical channel monitoring, the processing block comprising:

a wavelength reference (WLREF) circuit configured to generate a wavelength reference (WLREF) signal for use in wavelength calibration for optical channel monitoring;

an optical channel monitor (OCM) circuit configured for monitoring WDM channels, the monitoring comprising measuring one or more characteristics associated with WDM signals communicated via the WDM channels; and a wavelength division multiplexing (WDM) combiner circuit configured to generate a combined signal based on combining of a first combining input signal and a second combining input signal;

wherein the first combining input signal comprises an input WDM signal;

wherein the second combining input signal comprises the WLREF signal or a signal generated based on the WLREF signal;

wherein the OCM circuit is configured to apply the monitoring to the combined signal;

wherein the optical channel monitor (OCM) processing block further comprises an optical splitter circuit configured to split a splitting input signal to a plurality of splitting output signals via a corresponding plurality of split ports, and wherein the splitting input signal comprises the WLREF signal; and wherein the splitting input signal comprises the WLREF signal.

27. The system according to claim 26, wherein the WDM combiner circuit comprises one or more filters configured to apply filtering to one or both of the first combining input signal and the second combining input signal when generating the combined signal.

28. The system according to claim 27, wherein the one or more filters comprise one or both of an optical edge-pass filter and an optical bandpass filter.

29. A method for optical channel monitoring, the method comprising:

generating a wavelength reference (WLREF) signal for use in wavelength division multiplexing (WDM) measurement;

applying optical channel monitoring of WDM channels, the optical channel monitoring comprising measuring one or more characteristics associated with WDM signals communicated via the WDM channels;

generating a combined signal based on combining of a first combining input signal and a second combining input signal;

wherein:

the first combining input signal comprises an input WDM signal;

the second combining input signal comprises the WLREF signal or a signal generated based on the WLREF signal; and the optical channel monitoring is applied to the combined signal;

applying splitting to a splitting input signal, and outputting a plurality of splitting output signals, wherein the splitting input signal comprises the WLREF signal; and applying optically broadband splitting, wherein the optically broadband splitting comprises outputting the entire splitting input signal as each one of the plurality of splitting output signals.

30. The method according to claim 29, wherein generating the combined signal comprises applying one or more filtering functions.

31. The method according to claim 30, wherein the one or more filtering functions comprise one or both of optical edge-pass filtering and optical bandpass filtering.

32. A method for optical channel monitoring, the method comprising:

generating a wavelength reference (WLREF) signal for use in wavelength division multiplexing (WDM) measurement;

applying optical channel monitoring of WDM channels, the optical channel monitoring comprising measuring one or more characteristics associated with WDM signals communicated via the WDM channels;

generating a combined signal based on combining of a first combining input signal and a second combining input signal;

wherein:

the first combining input signal comprises an input WDM signal;

the second combining input signal comprises the WLREF signal or a signal generated based on the WLREF signal; and the optical channel monitoring is applied to the combined signal;

applying splitting to a splitting input signal, and outputting a plurality of splitting output signals, wherein the splitting input signal comprises the WLREF signal; and applying spectral splitting, wherein the spectral splitting comprises outputting variably the entire splitting input signal or a splitting output signal comprising a portion of the splitting input signal.

33. The method according to claim 32, wherein generating the combined signal comprises applying one or more filtering functions.

34. The method according to claim 33, wherein the one or more filtering functions comprise one or both of optical edge-pass filtering and optical bandpass filtering.

35. A method for optical channel monitoring, the method comprising:

generating a wavelength reference (WLREF) signal for use in wavelength division multiplexing (WDM) measurement;

applying optical channel monitoring of WDM channels, the optical channel monitoring comprising measuring one or more characteristics associated with WDM signals communicated via the WDM channels;

generating a combined signal based on combining of a first combining input signal and a second combining input signal;

wherein:

the first combining input signal comprises an input WDM signal;

the second combining input signal comprises the WLREF signal or a signal generated based on the WLREF signal; and the optical channel monitoring is applied to the combined signal;

applying splitting to a splitting input signal, and outputting a plurality of splitting output signals, wherein the splitting input signal comprises the WLREF signal; and applying wavelength division multiplexing (WDM) splitting, wherein applying the WDM splitting comprises outputting a first splitting output signal and a second splitting output signal, and wherein:

the first splitting output signal comprises an in-band portion of the WLREF signal corresponding to a WDM spectrum of the input WDM signal, and the second splitting output signal comprises an out-band portion of the WLREF signal corresponding to one or more spectrum portions outside the WDM spectrum of the input WDM signal.

36. The method according to claim 35, wherein generating the combined signal comprises applying one or more filtering functions.

37. The method according to claim 36, wherein the one or more filtering functions comprise one or both of optical edge-pass filtering and optical bandpass filtering.

38. A method for optical channel monitoring, the method comprising:

generating a wavelength reference (WLREF) signal for use in wavelength division multiplexing (WDM) measurement;

applying optical channel monitoring of WDM channels, the optical channel monitoring comprising measuring one or more characteristics associated with WDM signals communicated via the WDM channels;

generating a combined signal based on combining of a first combining input signal and a second combining input signal;

wherein:

the first combining input signal comprises an input WDM signal;

the second combining input signal comprises the WLREF signal or a signal generated based on the WLREF signal; and the optical channel monitoring is applied to the combined signal;

applying splitting to a splitting input signal, and outputting a plurality of splitting output signals, wherein the splitting input signal comprises the WLREF signal; and inputting one of the plurality of splitting output signals as the second combining input signal.

39. The method according to claim 38, wherein generating the combined signal comprises applying one or more filtering functions.

40. The method according to claim 39, wherein the one or more filtering functions comprise one or both of optical edge-pass filtering and optical bandpass filtering.

41. A method for optical channel monitoring, the method comprising:

generating a wavelength reference (WLREF) signal for use in wavelength division multiplexing (WDM) measurement;

applying optical channel monitoring of WDM channels, the optical channel monitoring comprising measuring one or more characteristics associated with WDM signals communicated via the WDM channels;

generating a combined signal based on combining of a first combining input signal and a second combining input signal;

wherein:

the first combining input signal comprises an input WDM signal;

the second combining input signal comprises the WLREF signal or a signal generated based on the WLREF signal; and the optical channel monitoring is applied to the combined signal;

applying splitting to a splitting input signal, and outputting a plurality of splitting output signals, wherein the splitting input signal comprises the WLREF signal; and applying switching, wherein the switching comprises selecting one signal from a plurality of switching input signals, and wherein one of the plurality of splitting output signals is inputted as one of the plurality of switching input signals.

42. The method according to claim 41, further comprising inputting the combined signal as another one of the plurality of switching input signals.

43. The method according to claim 41, further comprising applying the optical channel monitoring to the selected one signal.

44. The method according to claim 41, wherein generating the combined signal comprises applying one or more filtering functions.

45. The method according to claim 44, wherein the one or more filtering functions comprise one or both of optical edge-pass filtering and optical bandpass filtering.

46. A method for optical channel monitoring, the method comprising:

generating a wavelength reference (WLREF) signal for use in wavelength division multiplexing (WDM) measurement;

applying optical channel monitoring of WDM channels, the optical channel monitoring comprising measuring one or more characteristics associated with WDM signals communicated via the WDM channels;

generating a combined signal based on combining of a first combining input signal and a second combining input signal;

wherein:

the first combining input signal comprises an input WDM signal;

the second combining input signal comprises the WLREF signal or a signal generated based on the WLREF signal; and the optical channel monitoring is applied to the combined signal;

applying splitting to a splitting input signal, and outputting a plurality of splitting output signals, wherein the splitting input signal comprises the WLREF signal, wherein the splitting input signal comprises the WLREF signal.

47. The method according to claim 46, wherein generating the combined signal comprises applying one or more filtering functions.

48. The method according to claim 47, wherein the one or more filtering functions comprise one or both of optical edge-pass filtering and optical bandpass filtering.

* * * * *